United States Patent [19]

Haythornthwaite

[11] Patent Number: 4,489,912

[45] Date of Patent: Dec. 25, 1984

[54] HANDLE

[75] Inventor: Peter F. Haythornthwaite, Auckland, New Zealand

[73] Assignee: Merryware Industries, Inc., Auckland, New Zealand

[21] Appl. No.: 247,804

[22] Filed: Mar. 26, 1981

[30] Foreign Application Priority Data

Mar. 26, 1980 [NZ] New Zealand ........................ 193270

[51] Int. Cl.³ ............................................ F16M 13/00

[52] U.S. Cl. .................................................... 248/359

[58] Field of Search ................................ 248/359, 360

[56] References Cited

U.S. PATENT DOCUMENTS

| | | | |
|---|---|---|---|
| 831,391 | 9/1906 | Ubellar | 248/360 X |
| 1,299,745 | 4/1919 | Ludlow | 248/360 |
| 2,182,293 | 12/1939 | Hokerk | 248/359 |
| 2,243,634 | 5/1941 | Kadish | 248/359 |
| 2,304,547 | 12/1942 | Cutter | 248/359 |
| 2,910,208 | 10/1959 | Doyle | 248/359 X |
| 3,495,797 | 2/1970 | Ganz | 248/360 X |

*Primary Examiner*—William H. Schultz
*Attorney, Agent, or Firm*—Kegan & Kegan

[57] ABSTRACT

A tie is secured to a handle by being passed through an aperture in a clip. The clip is then firmly secured to the handle. The tie has an enlarged end, or an obstruction secured to its end, to prevent it from being removed through the aperture in the clip.

5 Claims, 2 Drawing Figures

HANDLE

BACKGROUND OF THE INVENTION

This invention relates to an improved handle which has been devised particularly for use with a brush although it also has other applications. Traditionally, brushes that might need to be hung up have been provided with a hole through the handle so that they can be hung on a hook, nail or some similar device. By means of the present invention a tie in the form of a loop of flexible material can be secured to the handle of the brush, or to some other object, e.g. a kitchen utensil, in an easy and convenient manner.

SUMMARY OF THE INVENTION

In a first aspect the present invention consists in an improved handle for an article, said handle having a hollow cap member having a hole through it and connecting means enabling the cap to be connected to the handle, and a tie of flexible material at least one end thereof passing through the hole in the cap and being secured therein.

In a second aspect the present invention consists in a method of attaching a tie of flexible material to an article, the method comprising the steps of passing a portion of the tie through an aperture in a cap, and securing the end of the tie so that it may not pass completely through the cap, and securing the cap to the article so that the trapped end of the tie is held within the space between the cap and the article while the remainder of the tie extending from the cap remains outside the article.

The above gives a broad description of the present invention, one preferred form of which will now be described with reference to the accompanying drawings in which:

FIG. 1 shows an article with a tie attached according to the present invention; and FIG. 2 is an exploded view of a portion of an article to which the tie is attached.

DESCRIPTION OF THE PREFERRED EMBODIMENTS

Figure 1:
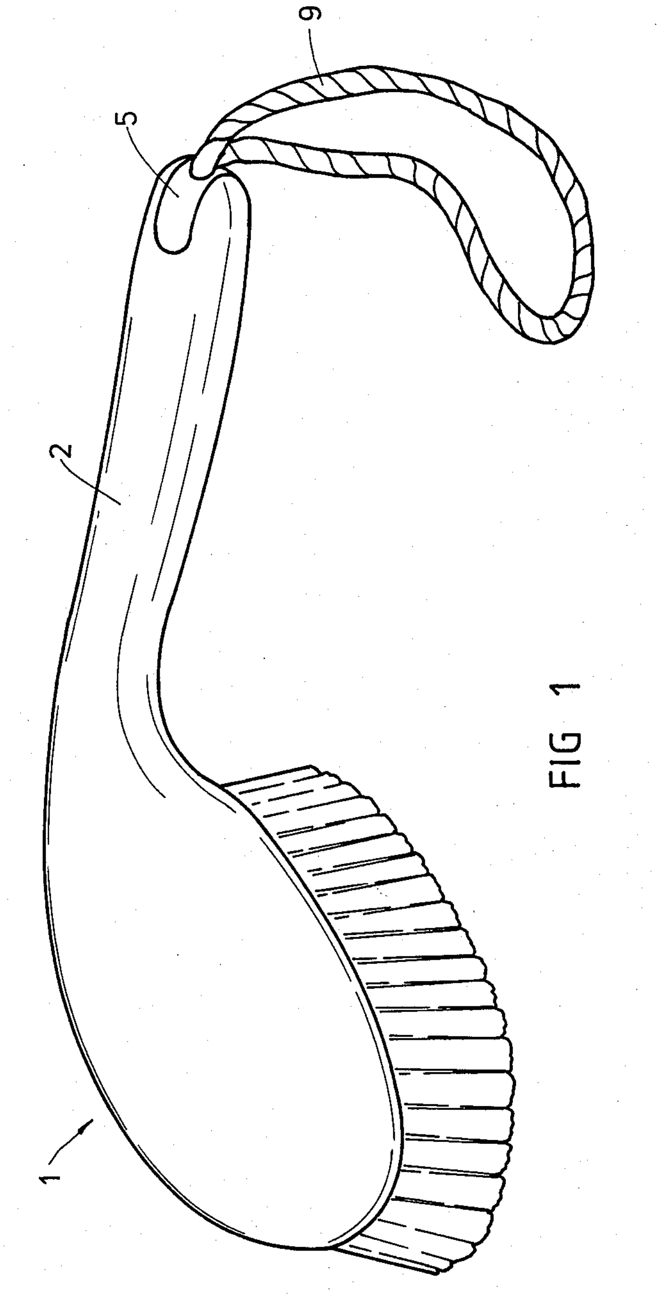
Figure 2:
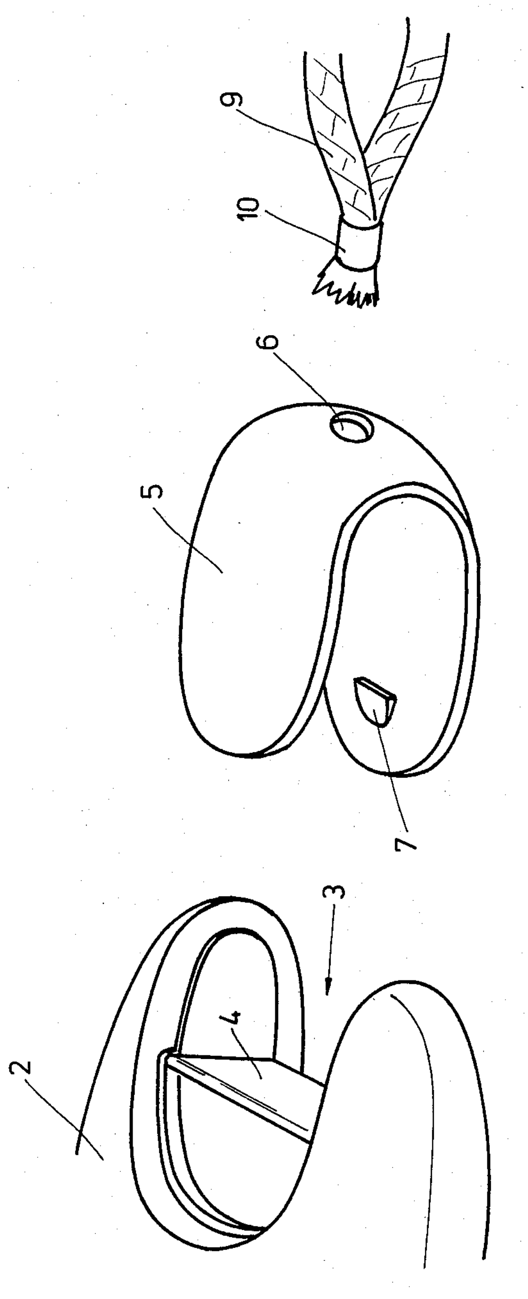

In the illustrated form of the present invention a brush 1 is provided with an elongate handle 2 which is roughly oval in cross-section. At the end of the handle there is provided a rebate 3 and a pair of ridges 4 within the rebate.

A cap 5 which is adapted to press onto the handle is substantially U-shaped in longitudinal cross-section and has an axial hole 6 through it. On the internal wall near each end of the cap there is a ridge 7 of triangular cross-section fashioned to allow the cap to be forced over the end of the handle so that the ridges 7 form a snap fit over the abovementioned ridges 4.

Before the cap is so fitted, a tie 9 of flexible material, such as string or rope, or perhaps some plastics material is fastened to the cap. This may be by passing both ends through the hole and securing them together. It is possible to have only one end pass through the cap. Various holding means may be used to secure the tie, such as by knotting, crimping on a short metal tube 10 or clamp or, for a plastics rope, by application of heat, and so on. The holding means is arranged to be unable to pass through the hole 6, so that it serves to prevent the tie from being separated from the cap.

In an alternative preferred form of the invention the handle has a substantially square or rectangular opening passing through it from one side to the other and being open to the end of the handle. A rebate extends around the periphery of this opening so that when the cap, which is substantially U-shaped in end view, is fitted to the end of the handle with an arm of the cap along each side of the handle to cover the opening, the edges of the cap are supported by the rebate and on the outer surfaces of the cap and handle there is a relatively smooth junction between them. On each side of the handle there is a recess in the rebate at the inner end of the opening and each recess is adapted to receive, in a snap fit, a similarly shaped projection, there being one located on the inner surface at the free end of each arm of the cap. When the tie is attached to the cap and this is in turn connected to the handle, that portion of the tie passing in through the hole in the cap is located within the opening at the end of the handle and so is concealed.

In modifications of the invention the shape of the opening, the shape of the cap, the nature of the rebate, and the locations and number of recesses and projections may be varied. The cap could even be cup-shaped, and be clipped or screwed (if of circular periphery) to the end of the handle with a space then left between the 'bottom' of the cap where the hole is located, and the end of the handle. There may also be two holes in the cap so that the tie, if a loop, can pass in one hole and exit through the other.

The object of the invention is to provide a very tidy means to fix the tie to the handle. It is preferred that both ends pass through the actual hole in the cap but one end could be secured to the other outside the cap or a plastic hanger could be moulded with a loop or aperture integrally formed in it and one leg available for passage through the hole in the cap and for securing therein.

There are many means of securing the cap to the handle, including gluing, screwing, pinning and the like but snap fitting is preferred because of its simplicity and speed of assembly.

The object of whatever means of union for fastening there is between cap and handle is to have the junction smooth and barely discernible in most instances. Although the invention above has been described for use with an article such as a brush, it will be appreciated that it could be applied to all sorts of articles.

I claim:

1. An improved handle and loop-tie for an article adapted for retention on the wrist-arm of a user when the user releases a grip on said handle, said handle assembly including elongate base adapted for user grasping and a hollow cap member generally of U-shape construction having a hole through a mediate portion thereof, connecting means enabling the cap to be connected to a C-shape distal end of the elongate base, and a loop-like tie of flexible material with at least one portion thereof passing through the hole in the cap and being secured in a hollow space defined by the perpendicularly disposed intermeshing of said U-shape cap to said C-shape base.

2. A handle assembly as claimed in claim 1 wherein the end secured within the cap is enlarged by means of a crimp attachment.

3. A handle assembly as claimed in claim 1 wherein both ends of the loop pass through the hole in the cap and are secured together.

4. A handle assembly as claimed in claim 1 wherein the cap is snap fitted to the handle.

5. A method of attaching a loop-like tie of flexible material to the elongate handle of an article adapted for retention on the wrist arm of a user when the user releases a grip on said handle, the method comprising the steps of passing a portion of the tie through an aperture in a mediate portion of a hollow generally U-shape cap, securing said portion of the tie preventing passage completely back through said aperture in the cap, and securing the cap to a C-shape distal end of the handle on said article with the trapped end of the tie held within a space defined by the perpendiculary disposed interconnection between the U-shape cap and the hollow C-shape portion of the handle while the remainder of the tie extending from the cap remains outside the handle of the article.

* * * * *